Patented Oct. 13, 1953

2,655,544

UNITED STATES PATENT OFFICE 2,655,544

ALKYLATION OF PHENOLS WITH POLYPROPYLENE

George M. McNulty and Thomas Cross, Jr., Union, N. J., assignors to Standard Oil Development Company, a corporation of Delaware No Drawing. Application December 29, 1945, Serial No. 638,436

3 Claims. (Cl. 260—609)

This invention relates to high molecular weight alkylated phenols useful in obtaining lubricating oil additives and detergents and to the preparation of such alkylated phenols and their useful derivatives from phenols and olefinic polymers of propylene.

Although it has been known to alkylate phenols by various alkylating agents to produce an assortment of useful products, the particular type of alkylated phenols with which the present invention is concerned is novel. The molecular weight and configuration of the alkyl side chains can be shown to be important factors in determining the value of the high molecular weight alkylated phenols for making lubricating oil additives and detergents, and problems arise in obtaining satisfactory yields of the most suitable alkylated phenols for this purpose partly on account of the susceptibility of known high molecular weight alkylating agents to react unfavorably under alkylation conditions.

Investigations were made of phenol akylations with polymer by-products of the manufacture of alcohols from petroleum refinery $C_4$ cuts, such by-products being principally butene polymers and copolymers with isobutylene, butadiene, and the like. Further, tetraisobutylene was used as an alkylating agent, and evidently in the alkylation there was a degradation of the tetramer to dimer, giving principally octyl ($C_8$ alkyl) phenols rather than higher molecular weight $C_{16}$ alkyl phenol. The best yields obtainable of high molecular weight alkyl phenols with such alkylating agents was in the range of 60–65% based on the weight of the alkylating agent. High molecular weight normal olefins react even less readily as alkylating agents.

An object of this invention is to provide a method of obtaining high molecular weight alkyl phenols and their derivatives of satisfactory characteristics for lubricating blends in improved yields and with economy. The attainment of this object and other specific objects will be understood from the following description.

A superior alkylating agent for obtaining the desired high molecular weight phenols has now been found to be made by polymerizing propylene with a Friedel-Crafts catalyst at ordinary or moderately low temperatures. Although various metal halide catalysts of the Friedel-Crafts type, such as aluminum chloride, may be used to promote the polymerization of propylene, the preferred catalysts are those that are somewhat more moderate in activity than aluminum chloride, such as boron trifluoride.

The propylene polymerization product formed under the conditions stated, after separation of volatile components, contains olefinic polymers ranging from $C_9$ hydrocarbons upwardly in molecular weight, and predominately contains $C_{18}$ to $C_{24}$ hydrocarbons. The entire polymer product containing $C_9$ and higher polymers may be satisfactorily used as the alkylating agent, but it is preferable to use a middle cut of the polymer product distilled under vacuum. This middle cut is estimated to have a boiling range of about 295–325° C. at atmospheric pressure and is found to contain $C_{18}$ to $C_{24}$ propylene polymers.

The desired high molecular weight alkylated phenols are obtained in 85% to nearly 100% yield by alkylating phenol with the propylene polymer product or its middle cut at slightly elevated temperatures, such as in the range of 30° C. to about 100° C. in the presence of an inorganic halide catalyst. The same inorganic halide catalyst may be used as used in the polymerization; and again, the preferred catalyst is boron trifluoride. Thus the polymerization product does not have to be treated to remove residual catalyst before being used in the alkylation, but additional catalyst may be supplied for the alkylation to the extent necessary.

For the purpose of illustration, a middle cut of propylene polymers boiling in the range 295–325° C. was used to alkylate phenol at 30°–50° C. with 3% boron fluoride as a catalyst to obtain a yield above 85% based on the polymers. The molecular weight of the recovered alkylated phenols corresponded to an alkyl phenol with an average alkyl side chain of about 21 carbon atoms as shown by the following analytical data:

TABLE I

Analysis of high molecular weight alkylated phenols

| | Carbon, percent | Hydrogen, percent | Acetyl number |
|---|---|---|---|
| Analysis of product | 83.68 | 12.59 | 136 |
| Calculated analysis of: | | | |
| Phenol with 20 C atom alkyl side chain | 83.42 | 12.30 | 134.8 |
| Phenol with 23 C atom alkyl side chain | 83.70 | 12.50 | 122.5 |

Thus, it is indicated that the phenols were substituted in their aromatic nuclei by $C_{18}$ to $C_{24}$ propylene polymers, as monoalkyl side chain groups, without substantial degradation of these polymers in the alkylation reaction, although butylene polymers tend to be decomposed under the alkylation conditions in the presence of condensation catalysts or Friedel-Crafts catalysts employed in alkylating.

The aromatic reactant to be alkylated may be varied, but the preferred aromatic reactants are oxy-aryl compounds, such as ordinary phenol (hydroxy benzene), p-cresol (p-methyl phenol), and m-cresol (o-methyl phenol), which undergo nuclear substitution in alkylation.

The high molecular weight alkyl phenols having various uses as intermediates in forming resins and detergents and as blending agents themselves, but the propylene polymer alkylated phenols have been found particularly useful in forming stable addition agents for petroleum lubricating oils.

For example, one type of oil addition agent may be formed by sulfurizing the alkyl phenols with sulfur halides and then neutralizing the alkyl phenol sulfides with a compound of a base forming metal to form salts, such as those of potassium, lithium, calcium, magnesium, barium, zinc, or aluminum, or the like. Salts of the alkaline earth metals, such as calcium and barium, are the most suitable ordinarily.

The alkyl phenol sulfides are readily prepared by reacting 2 moles of alkyl phenol with 1 to 2 moles of sulfur mono or dichloride in a suitable solvent, such as chloroform, at from room temperature up to the boiling point of the solvent. When preparing alkyl phenol sulfides on a commercial scale, using technical grades of sulfur chlorides, ratios of 1.5 or so moles of sulfur halide to 2 moles of alkylated phenol will often be found desirable. In such a case, although the product obtained when using sulfur dichloride will be expected to be essentially an alkyl phenol monosulfide, and when using sulfur monochloride will be expected to be an alkyl phenol disulfide, some quantities of polysulfides and of polymeric materials will also be formed.

The alkyl phenol sulfides are conveniently converted to metal salts by dissolving them in mineral lubricating oil and neutralizing with a metal hydroxide. Barium hydrate $(Ba(OH)_2 \cdot 8H_2O)$ reacts with the alkyl phenol sulfide in oil solution at 110–150° C. to form the normal salt. The analysis of a 40% oil solution of a typical barium salt of a propylene polymer alkyl phenol sulfide is as follows:

| | Per cent |
|---|---|
| Barium | 5.22 |
| Sulfur | 1.94 |

Comparative engine tests with a single cylinder Caterpillar diesel test engine were conducted to determine the efficacy of metal alkyl phenol sulfides formed from the propylene polymer alkylated phenols using a standardized test procedure. In this procedure a 40% oil concentrate is made up of an additive, a certain percentage of the concentrate is blended with a petroleum base lubricating oil, used also as a control without any additive, and the lubricating oil samples are used in the test engine run for a period, after which the engine is taken down and inspected. On inspection, the condition of the engine parts is rated on a scale which makes the demerit rating higher if the parts are more fouled by carbonaceous deposits.

TABLE II

Engine tests

[126-hour Caterpillar Type 1A tests;[1] S. A. E. 30 phenol-extracted Mid-Continent base oil]

| Lubricating oil | Additive | Ring zone demerits |
|---|---|---|
| Base oil (control) | None | 2.32 |
| Do | +2.5% concentrate of barium salt of ($C_{21}$ average) propylene polymer alkylated phenol sulfide. | .51 |
| Do | +2.5% concentrate of barium salt of tert. octyl ($C_8$) alkylated phenol sulfide.[2] | 1.47 |

[1] Test procedure described in Diesel Lubricant Test Manual of the Caterpillar Tractor Company; also known as Coordinating Research Council Designation L-1-545.
[2] Phenol was alkylated with diisobutylene.

Thus, the salts of phenol sulfides alkylated by propylene polymers were demonstrated to be considerably more effective as inhibitors than salts of phenol sulfides alkylated by lower molecular weight branched olefin groups. In a like manner, it has been demonstrated that salts of phenol sulfides alkylated by high molecular weight normal chlorinated paraffins, such as chlorinated wax having 16 and more carbon atoms per molecule are even less effective inhibitors than the latter. Accordingly, the propylene polymer alkyl group is considered to have a branched configuration which is more suitable than a normal alkyl group of corresponding molecular weight for improving stability of lubricating oils. As already pointed out, the propylene polymer group itself is found more stable than a butylene polymer group as regards conversion in alkylation reactions.

The propylene polymer phenols may be used for preparing other lubricating oil addition agents such as metal alkyl phenates, metal alkyl phenol phosphates, phosphites, thiophosphates and thiophosphites, metal salts of alkyl phenol sulfonic acids, and the like. For example, a polypropylene-phenol may be treated with $P_2S_5$ to form an organo-substituted thio acid of phosphorus which may then be converted to a metal salt, such as the zinc salt. Other valuable additives may be prepared by converting the propylene polymer phenols or their sulfides to metal salts such as those of barium or calcium and treating the products with sulfur or with a sulfide of phosphorus.

From the foregoing, it will be understood that one advantage gained through the employment of the propylene polymers as alkylating agents is the production of much higher yields of high molecular weight branched-chain alkyl phenols than can be obtained with other branched-chain alkylating agents. Another advantage gained is the production of more suitable branched-chain alkyl phenols for preparing superior blending agents for stabilizing lubricating oils against sludging and the development of corrosive oxidation products.

The propylene polymer alkylated products have been shown to be mainly useful as improved blending agents for motor oils but they have uses in many other fields, for example, in various mineral oils which perform lubricating functions at elevated temperatures, in diesel fuels, industrial oils, insulating oils, greases, gear lubricants, etc. They may be used in other organic compositions such as natural and synthetic rubbers, copolymer resins formed from hydrocarbons, and in motor fuels. In general, the alkylated phenol sulfide salt when used as a stabilizing or as an anti-oxidant agent is blended in concentrations ranging from about 0.1 to about 2% by weight with heavy oils, lubricants or plastics. With light oils or fuels, smaller concentrations, such as about 0.01 to 1.0% may be used. Propylene alkylated products may also be used to perform other functions, e. g., in increasing freeze resistance and plasticizing, and in such instances be required in proportions up to 5%, 20% or higher. They may be used with admixtures of other agents such as fatty oils, soaps, fatty acids, organic polymers, higher alcohols, esters, sulfurized fatty oils, organo-metallic compounds, and other additives employed in fuels, lubricants, and plastic or solid organic compositions.

This invention is not to be limited by the description and examples given for the purpose of illustration, and modifications or variations therefrom conforming to the spirit of the invention are intended to be included within the scope of the claims.

We claim:

1. The process of preparing a high molecular weight alkylated phenol product, which comprises polymerizing propylene in the presence of boron fluoride as a catalyst at a temperature sufficiently low to form a polymer product containing predominantly propylene polymers having about 18 to 24 carbon atoms per molecule, and reacting a phenol with said polymers in the presence of boron fluoride as a catalyst at a higher temperature in the range of about 30 to 50° C.

2. The process of preparing an alkylated phenol product, which comprises polymerizing propylene in the presence of boron fluoride as a catalyst at a temperature sufficiently low to form a polymer product containing predominantly propylene polymers having 18 to 24 carbon atoms per molecule, reacting phenol with a thus-obtained propylene polymer having between 18 to 24 carbon atoms per molecule in the presence of boron fluoride as a catalyst at a temperature in the range of 30 to 50° C. to form an alkyl phenol in which the propylene polymer is the substituent alkyl side chain group, reacting 2 moles of the alkyl phenol with 1 to 2 moles of sulfur dichloride at about room temperature to form an alkyl phenol sulfide, and reacting the alkyl phenol sulfide with barium hydrate at about 110 to 150° C. to form a normal barium salt of the alkyl phenol sulfide.

3. The process of preparing a high molecular weight alkylated phenol product, which comprises polymerizing propylene selectively to propylene polymers containing at least 9 and predominantly between 9 and 24 carbon atoms per molecule, thereafter maintaining said polymers at below their normal boiling points and reacting said polymers with a phenol in the presence of an inorganic halide alkylation catalyst at a temperature in the range of 30° to 100° C., whereby alkylated phenols having 9 to 24 carbon atoms in the alkyl side chain corresponding to the number of carbon atoms in said propylene polymers are obtained in an 85% to 100% yield.

GEORGE M. McNULTY.
THOMAS CROSS, Jr.

References Cited in the file of this patent

UNITED STATES PATENTS

| Number | Name | Date |
|---|---|---|
| 1,898,627 | Hoffman et al. | Feb. 21, 1933 |
| 1,954,985 | Buc | Apr. 17, 1934 |
| 2,076,201 | Langedijk et al. | Apr. 6, 1937 |
| 2,091,565 | Perkins et al. | Aug. 31, 1937 |
| 2,139,321 | Mikeska et al. | Dec. 9, 1938 |
| 2,193,760 | Dreisback et al. | Mar. 12, 1940 |
| 2,197,833 | Reiff | Apr. 23, 1940 |
| 2,213,477 | Steindorf | Sept. 3, 1940 |
| 2,228,661 | Gardiner | Jan. 14, 1941 |
| 2,349,211 | Tulleners | May 16, 1944 |
| 2,360,302 | Etzler et al. | Oct. 10, 1944 |
| 2,361,804 | Wilson | Oct. 31, 1944 |
| 2,362,293 | McNab | Nov. 7, 1944 |
| 2,374,559 | Morris | Apr. 24, 1945 |
| 2,388,074 | Patterson et al. | Oct. 30, 1945 |
| 2,398,253 | Rogers et al. | Apr. 9, 1946 |
| 2,404,340 | Zimmerman | July 16, 1946 |
| 2,460,025 | McNab | Jan. 25, 1949 |